(12) United States Patent
Guilloteau

(10) Patent No.: US 12,486,947 B2
(45) Date of Patent: Dec. 2, 2025

(54) TANK, IN PARTICULAR FOR A LIQUID HYDROGEN RESERVOIR, PROVIDED WITH INTERNAL RAILS FOR PUTTING AN EQUIPMENT MODULE IN PLACE

(71) Applicant: Airbus Operations SAS, Toulouse (FR)

(72) Inventor: Damien Guilloteau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 12 days.

(21) Appl. No.: 17/872,311

(22) Filed: Jul. 25, 2022

(65) Prior Publication Data
US 2023/0036429 A1 Feb. 2, 2023

(30) Foreign Application Priority Data
Jul. 29, 2021 (FR) ...................................... 2108276

(51) Int. Cl.
*F17C 1/00* (2006.01)
*F17C 13/08* (2006.01)

(52) U.S. Cl.
CPC .............. *F17C 1/00* (2013.01); *F17C 13/084* (2013.01); *F17C 2201/0109* (2013.01); *F17C 2205/0153* (2013.01); *F17C 2209/222* (2013.01); *F17C 2209/232* (2013.01); *F17C 2221/012* (2013.01); *F17C 2223/0153* (2013.01)

(58) Field of Classification Search
CPC ................ F17C 1/00; F17C 2205/0153; F17C 2209/232; F17C 2221/012; F17C 2223/0153; F17C 2203/013; F17C 2205/01; F17C 2205/03; F17C 2205/0302

USPC ................................................... 220/581, 592
See application file for complete search history.

(56) References Cited

U.S. PATENT DOCUMENTS

| | | | |
|---|---|---|---|
| 2,860,809 A | 11/1958 | Perry | |
| 3,235,344 A * | 2/1966 | Dreyer | B01J 8/0492 208/217 |
| 2005/0166992 A1* | 8/2005 | Yokota | F17C 11/005 141/51 |
| 2007/0175902 A1* | 8/2007 | Gustafsson | B65D 90/026 220/560.12 |

(Continued)

FOREIGN PATENT DOCUMENTS

| | | | |
|---|---|---|---|
| CN | 110701478 A | * | 1/2020 |
| CN | 111256032 A | * | 6/2020 |

(Continued)

OTHER PUBLICATIONS

English Machine Translation of CN-111256032-A (Year: 2020).*

(Continued)

*Primary Examiner* — Don M Anderson
*Assistant Examiner* — Laura E. Parker
(74) *Attorney, Agent, or Firm* — Lerner David LLP

(57) ABSTRACT

A tank, in particular for a liquid hydrogen reservoir, provided with internal rails for putting an equipment module in place, includes
a central portion provided with a wall, and at least one rail and preferably a plurality of rails, each of the rails being integrated in the wall of the central portion of the tank so as to be accessible from inside the tank, such rails allowing easier integration and fastening of a module comprising equipment inside the tank, so as to simplify the manufacture and assembly of the tank.

9 Claims, 4 Drawing Sheets

(56) References Cited

U.S. PATENT DOCUMENTS

2018/0066796 A1* 3/2018 Heon ...................... B21C 23/10

FOREIGN PATENT DOCUMENTS

| EP | 3421864 | A1 | | 1/2019 | |
|----|---------|----|---|--------|---|
| EP | 3421864 | B1 | * | 1/2020 | ............... F17C 3/00 |
| GB | 2596808 | A | * | 1/2022 | ............... B63B 3/13 |
| WO | 2005085099 | A1 | | 9/2005 | |
| WO | 2012065616 | A1 | | 5/2012 | |

OTHER PUBLICATIONS

English Machine Translation of CN-110701478-A (Year: 2020).*
English Machine Translation of EP-3421864-B1 (Year: 2020).*
French Search Report dated Mar. 16, 2022 for Application No. FR 2108276. 2 pgs. (see p. 1, categorizing the cited references).

* cited by examiner

TANK, IN PARTICULAR FOR A LIQUID HYDROGEN RESERVOIR, PROVIDED WITH INTERNAL RAILS FOR PUTTING AN EQUIPMENT MODULE IN PLACE

FIELD OF THE INVENTION

The present invention relates to a tank, in particular for a liquid hydrogen reservoir, and to a liquid hydrogen reservoir provided with such a tank.

BACKGROUND OF THE INVENTION

Since liquid hydrogen is an environmentally acceptable fuel that does not emit greenhouse gases, developing its use and using it in the future in very varied fields and in particular in aircraft, in particular in transport planes, is envisaged.

In such a use in particular, liquid hydrogen has to be stored in a suitable reservoir.

In a conventional manner, a liquid hydrogen reservoir has a complex assembly of structures and systems, such as pipes, sensors, anti-slosh walls, which are mounted in an (internal) tank of the reservoir.

All these elements have to be attached to the internal structure of the tank via fastening tabs. Such an assembly thus requires a very high number of fastening tabs that are, generally, all welded to the internal wall of the tank.

As a result of substantial accessibility constraints, these fastening and welding operations are very difficult to perform, and the assembly of these elements is lengthy and difficult to implement.

BRIEF SUMMARY OF THE INVENTION

The present invention relates to a tank, in particular for a liquid hydrogen reservoir, said tank comprising a central portion provided with a wall, which has the aim of overcoming these drawbacks.

According to an embodiment of the invention, said tank has at least one rail, said rail being integrated in the wall of the central portion of the tank so as to be accessible from inside the tank. Preferably, said rail is welded to said wall.

Thus, according to an aspect of the invention, one or more rails are integrated in the wall of the tank. Such rails allow easier insertion and fastening inside the tank of a module comprising all of the equipment, as explained below, and this makes it possible in particular to overcome the accessibility constraints and to simplify the manufacture and assembly of the tank.

Advantageously, the rail is provided on an internal face with a slideway intended to receive at least one connecting element, said slideway allowing a translational movement of the one or more connecting elements In addition, advantageously, the tank has a plurality of longitudinal rails integrated in the wall of the central portion while being oriented so as to have mutually parallel directions.

Furthermore, advantageously, the tank has at least one frame provided with passage openings, which is able to be arranged transversely in the tank, by being mounted on the rails.

In a particular embodiment, the tank has a plurality of connecting elements, each of said connecting elements being fastened to the frame via one of its ends and being provided at the other end with a head that is able to slide by cooperating with the rail and is able to be fastened to the rail.

In a preferred embodiment, the tank has a module formed of a plurality of frames that are connected together via equipment, said module being able to be arranged in the tank, by being mounted on the rails.

The present invention also relates to a liquid hydrogen reservoir, which has a tank as described above.

The present invention relates, in addition, to a method for manufacturing and assembling a tank as described above or a liquid hydrogen reservoir as mentioned above.

According to an aspect of the invention, said method involves at least the following steps:
- a manufacturing step consisting in manufacturing a tank provided with a central portion, said central portion having a wall in which rails are integrated;
- a mounting step consisting in mounting equipment in a plurality of frames that are disposed side by side and provided with connecting elements, so as to form a module;
- an insertion step consisting in inserting the module into the tank by sliding heads of the connecting elements in the rails; and
- a fastening step consisting, in a position in which the module is mounted in the tank, in holding the module in position.

Preferably, the fastening step consists, so as to hold the module in position, in fastening the heads of the connecting elements to the rails.

BRIEF DESCRIPTION OF THE DRAWINGS

The appended figures will make it easy to understand how the invention may be implemented. In these figures, identical references denote similar elements.

DETAILED DESCRIPTION

Figure 1:
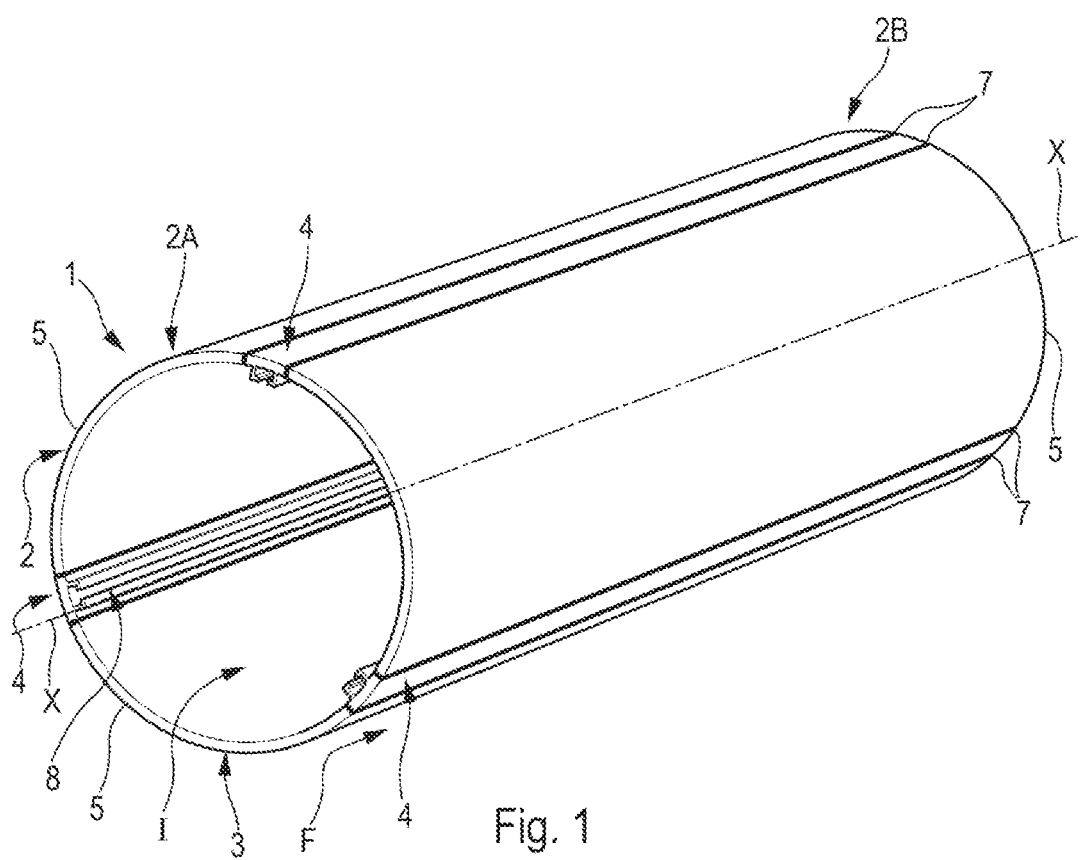
FIG. 1 is a schematic view, in perspective, of a particular embodiment of the central portion of a tank provided with rails.
Figure 2:
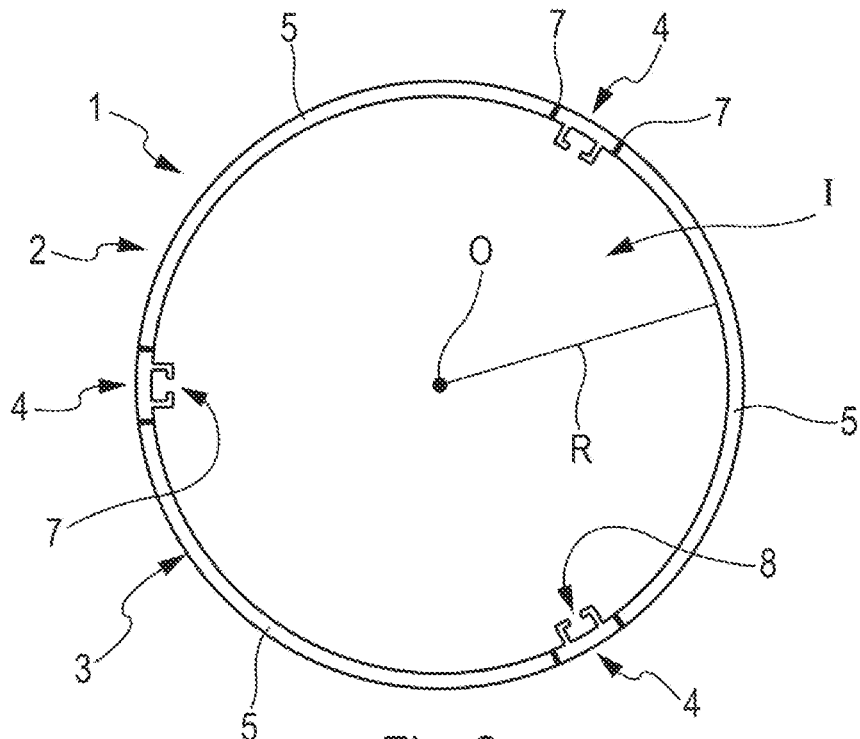
FIG. 2 is a schematic transverse view of the tank in FIG. 1.
Figure 3:
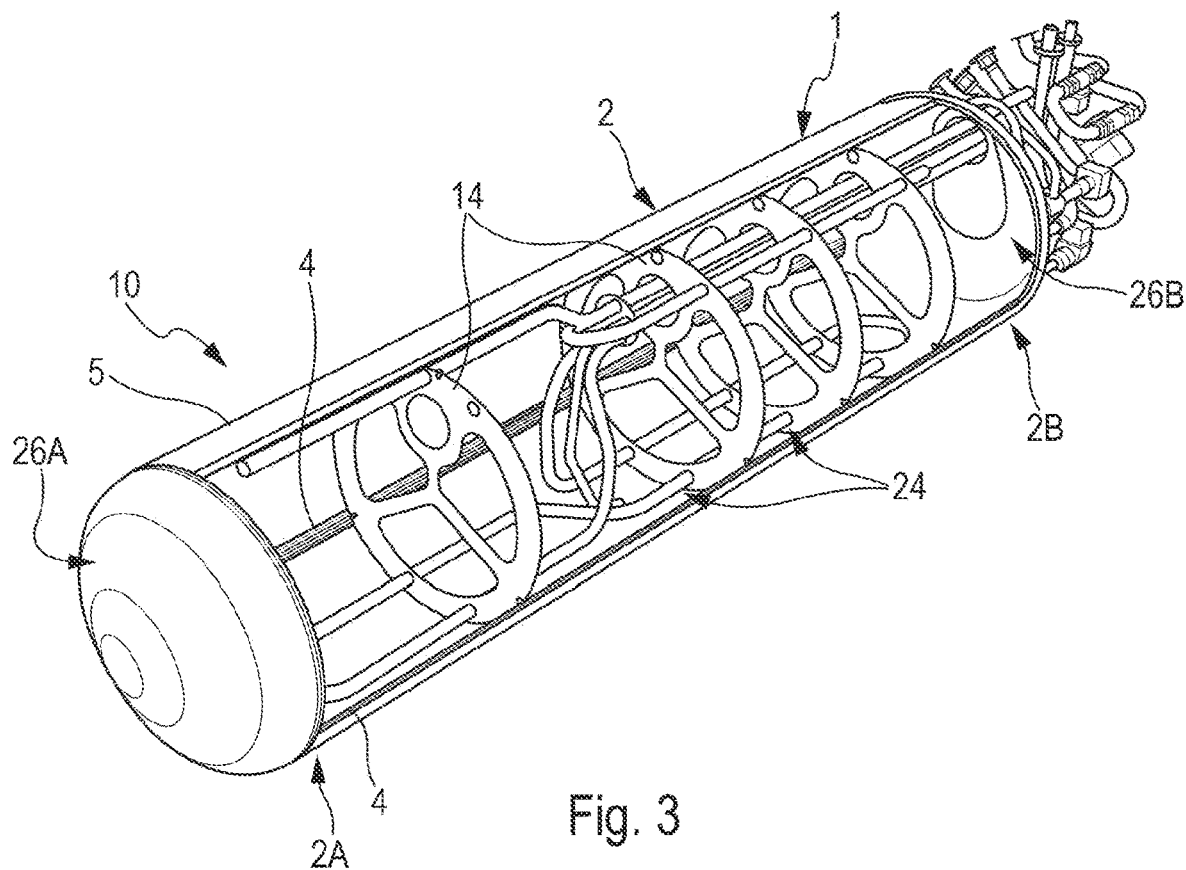
FIG. 3 is a schematic view, in perspective, of a particular embodiment of a liquid hydrogen reservoir, which is partially open in order to make the inside thereof visible.

The tank 1 that makes it possible to illustrate the invention and is shown schematically and partially in a particular embodiment in FIGS. 1 and 2 is particularly suitable for being mounted in a liquid hydrogen reservoir 10, such as the one shown in FIG. 3.

In a conventional manner, such a liquid hydrogen reservoir 10 generally has, in addition to the tank 1 that is an internal tank, a second tank called an external tank (not shown). The internal tank is mounted in the external tank, and it comprises functional equipment specified below.

Although not exclusively, a liquid hydrogen reservoir 10 is particularly well suited to being fitted to an at least partially hydrogen-powered vehicle. In a preferred manner, the reservoir 10 is intended to be fitted to an aircraft, in particular a transport plane.

In the preferred embodiment, shown in FIGS. 1 and 2, the tank 1 comprises a central portion 2 of cylindrical shape, representing a shell, of longitudinal axis X-X. This central portion 2 has a wall 3. The tank 1 can also have two domes 26A, 26B (FIG. 3) each of which is mounted in a conventional manner at one of the ends 2A, 2B of the central portion 2.

In the context of the present invention, the tank can comprise a central portion having shapes other than a cylindrical shape, for example a conical shape or a shape with an oblong or any other cross section. The shape of the tank can, in particular, be adapted to the space available for the arrangement of the liquid hydrogen reservoir, in particular when the latter is intended to be fitted to a vehicle, for example an aircraft.

The tank 1 also comprises rails 4 that are integrated in the wall 3 of the central portion 2 and are welded therein, as explained below. The rails 4 are accessible from inside the tank 1.

In the following description:
- the terms "internal" and "inside" apply to the space surrounded and delimited by the wall 3 of the tank 1, as illustrated by an arrow I in FIG. 1; and
- the terms "external" and "outside" apply to that which is outside the space surrounded by the wall 3 of the tank 1, as illustrated by an arrow F in FIG. 1.

The central portion 2 also comprises a plurality of panels 5 that are elongate (along the longitudinal axis X-X), of curved (concave) shape in cross section. The curvature of each of the panels 5 corresponds to that of an arc of a circle of radius equal to the radius R of the central portion 2. FIG. 2 shows the radius R defined between a central point O (situated on the longitudinal axis X-X) and the wall 3.

In a particular embodiment, the panels 5 are identical, and a rail 4 is integrated between each pair of adjacent panels 5.

In addition, in a particular embodiment, the rails 4 are transversely distributed uniformly, namely with equal distance from one rail to a neighboring rail.

In the embodiment shown in FIGS. 1 and 2, the central portion 2 has three identical panels 5 and three rails 4 that are also identical.

Figure 4:
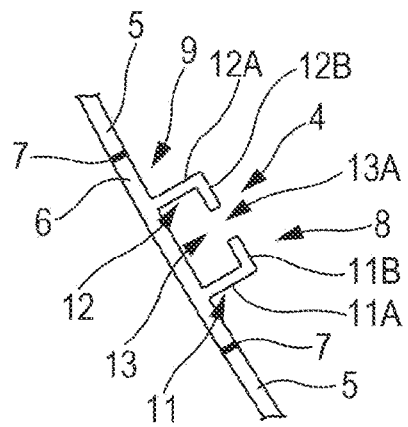
FIG. 4 is a schematic view, in cross section, of a part of a central portion of a tank, provided with a rail.

Each of the rails 4 comprises, as shown in FIG. 4, an elongate base 6. The base 6 preferably has a curved (concave) shape in cross section, with substantially the same curvature as that of the panels 5 of the central body 2.

Each of the rails 4 is therefore welded to two adjacent panels 5. The rails 4 and the panels 5 are butt-welded together via longitudinal weld beads 7.

Preferably, this welding is carried out via FSW (Friction Stir Welding). In the context of the present invention, other conventional welding methods can also be employed.

Each of the rails 4 comprises a slideway 8 on an internal face 9 of the base 6, as shown in FIG. 4. This slideway 8, which is therefore accessible from inside the tank 1, is intended to allow a translational movement of connecting elements 16, as explained below. To this end, the slideway 8 comprises a recess 13 intended to receive a head 18 of a connecting element 16 and, as explained below, the recesses 13 in the slideways 8 of the rails 4 and the heads 18 of the connecting elements 16 have cooperating shapes.

In the embodiment in FIG. 4, the slideway 8 comprises two elongate brackets 11 and 12. Each of these brackets 11 and 12 comprises a flat and elongate branch 11A, 12A, which is as one with the base 6, and a branch 11B, 12B (which is also flat and elongate) connected perpendicularly to the branch 11A, 12A respectively. The brackets 11 and 12 are arranged with their branches 11B and 12B facing one another so as to form a recess 13 provided with an opening 13A.

In a variant embodiment (not shown), the brackets can be arranged in opposite directions, with their branches 11B and 12B facing away from one another. In this variant, a connecting element of complementary shape is also provided.

The brackets 11 and 12 can be added pieces that are fastened to the base 6. However, in a preferred embodiment, the brackets 11 and 12 and the base 6 form a single piece.

In a particular embodiment, each of these rails 4 is a profiled component, which is preferably extruded. It is thus possible to manufacture and use standard pieces for the rails 4, and this makes it possible in particular to reduce the manufacturing cost thereof and therefore that of the tank 1.

In a particular embodiment (not shown), the longitudinal ends of the rails 4 are chamfered to make it easier to weld the domes that are fastened to the ends of the tank 1 so as to close it.

Figure 5:
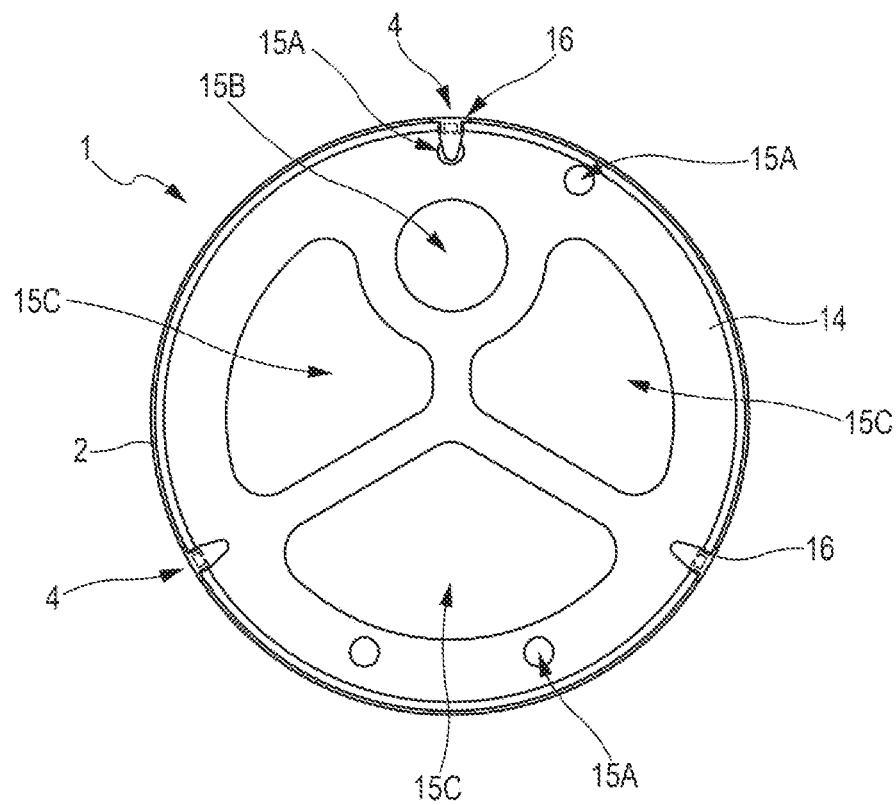
FIG. 5 is a schematic transverse view of a tank provided with a frame.

Furthermore, the tank 1 has a plurality of frames 14, such as the one shown in FIG. 5.

Each of these frames 14 corresponds to a disk, of diameter slightly smaller than that of the tank 1, as explained below. This disk is provided with passage openings 15A, 15B and 15C, of various shapes and sizes. In the example shown in FIG. 5, the passage openings 15A and 15B, which are of circular shape, can be intended (if necessary) for the passage of equipment. As for the passage openings 15C of larger size, they allow the passage of the fluid (liquid hydrogen) so as to confer an anti-slosh function on the frame 14.

Each of the frames 14 is able to be mounted transversely in the tank 1, preferably such that the disk forming the frame 14 is arranged orthogonal to the longitudinal axis X-X.

Figure 6:
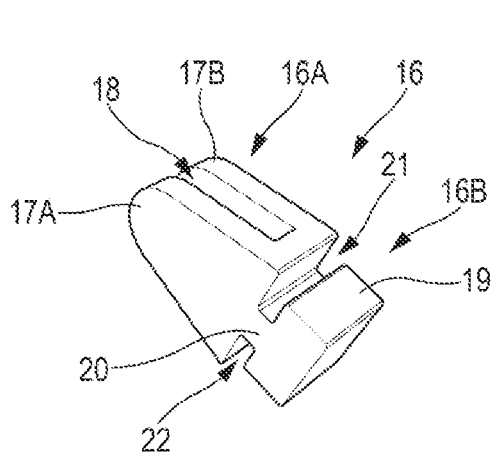
FIG. 6 is a view, in perspective, of a connecting element.
Figure 7:
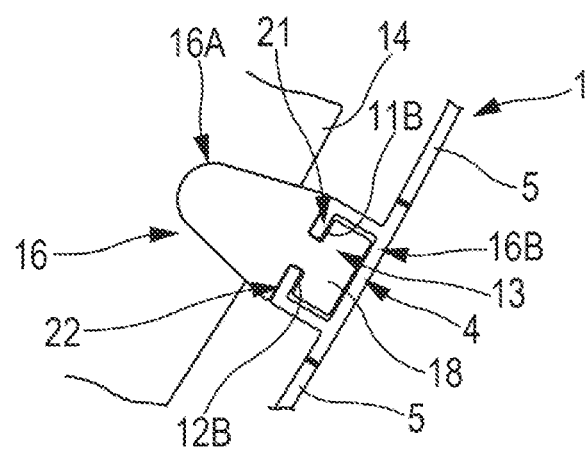
FIG. 7 is a schematic view, in cross section, of a connecting element connecting a partially shown frame to a rail.

Each of the frames 14 is mounted in the tank 1 by being connected to the rails 4. To this end, a plurality of connecting elements 16, such as the one shown in FIGS. 6 and 7, are provided, which are intended to allow the connection of the frames 14 to the rails 4.

Each of the connecting elements 16 is fastened to a frame 14 by one 16A of its ends 16A, 16B. In a particular embodiment, the end 16A is provided with two flat and identical branches 17A and 17B, which are arranged side by side in parallel so as to create a free space 18 into which an edge of the frame 14 is inserted. In this case, as shown in FIG. 7, the end 16A of the connecting element 16 is fastened to the frame 14, preferably by welding.

In addition, each of the connecting elements 16 is provided, at the other end 16B, with a head 18 that is able to slide in the rail 4 while being held therein.

The heads 18 of the connecting elements 16 and the recesses 13 (FIG. 4) of the slideways 8 of the rails 4, which are intended to receive these heads 18, have cooperating shapes. Cooperating shapes is understood to mean shapes that are identical, but with a size of the outline of the head 18 that is slightly smaller than that of the recess 13 so as to allow a translational movement of the head 18 in the recess 13, while at the same time being held therein.

In the example shown in FIGS. 6 and 7, the head 18 and the recess 13 have a rectangular shape in cross section. Cooperating shapes other than a rectangular shape can of course be provided for the heads 18 and the recesses 13.

The ends 16A and 16B of the connecting element 16 are connected together via a tongue 20 (FIG. 6) making it possible to form two lateral grooves 21 and 22. As shown in FIG. 7, the branches 11A and 11B of the brackets 11 and 12 enter the lateral grooves 21 and 22 respectively, and this makes it possible to ensure good stability.

In a preferred embodiment, the tank 1 has a module 24 formed of a plurality of frames 14 that are connected together via equipment 25, in particular pipes, sensors, a cold finger, etc., as explained below. This module 24 is able to be inserted into the tank 1, as shown in FIG. 3 and explained below, via the connecting elements 16 and the rails 4.

The frames 14, as described above, have numerous advantages. Specifically, each of the frames 14 used, which are manufactured for example from aluminum, performs all of the following functions:
  it acts as support for all the equipment 25 specified below, inside the tank 1, and this makes it possible to omit all the conventional fastenings;
  it can act as anti-slosh frame, and this makes it possible to omit the conventional anti-slosh walls; and
  it contributes to structural stability of the module 24 being obtained.

There follows an explanation of a method for manufacturing and assembling the tank 1, as described above, of the liquid hydrogen reservoir 10.

Figure 8:
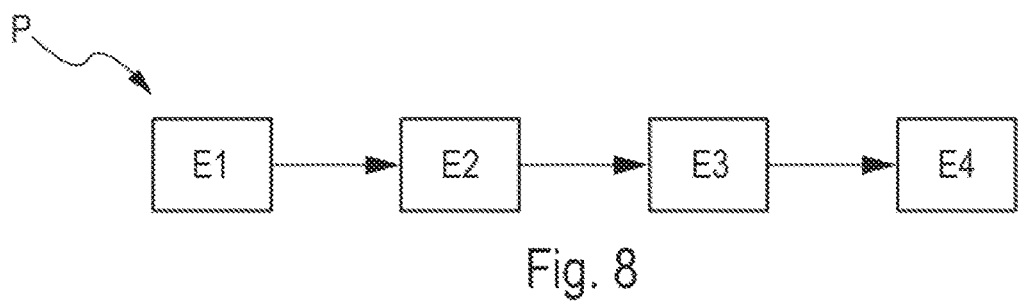
FIG. 8 schematically shows the main steps of a method for manufacturing and assembling a tank.

This assembly and manufacturing method P involves, as shown in FIG. 8, the following successive main steps:
  a manufacturing step E1;
  a mounting step E2;
  an insertion step E3; and
  a fastening step E4.

The manufacturing step E1 consists in manufacturing a tank 1 comprising a central portion 2 provided with integrated rails 4 (FIG. 1). To this end, use is made of panels 5 and rails 4, preferably of standard shape, that are arranged in alternation, and each rail 4 is welded on either side to a panel 5 so as to obtain the central portion 2 with integrated rails 4.

In this manufacturing step E1, various conventional welding methods can be employed to weld the rails 4 to the panels 5. However, this welding is preferably carried out via FSW (Friction Stir Welding).

Figure 9:
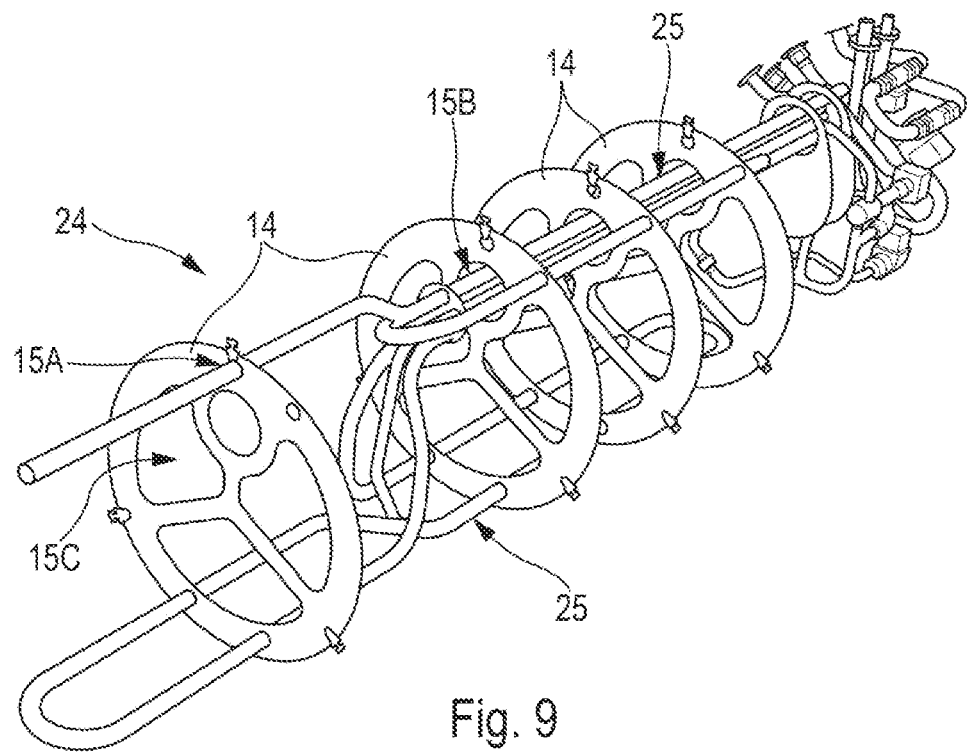
FIG. 9 is a view, in perspective, of a module provided with frames and equipment.

The mounting step E2 consists, for its part, in mounting equipment 25 in a plurality of frames 14 that are disposed side by side and provided with connecting elements 16, so as to form a module 24, as shown in FIG. 9.

The equipment that is identified by a general reference 25 relates to all of the equipment that has to be arranged inside the tank 1 and is necessary for the operation thereof, as internal tank of a liquid hydrogen reservoir 10. It is mainly a question of pipes (or ducts). To this end, some of the equipment 25, in particular pipes, is made to pass through some of the passage openings 15A and 15B in the frames 14, and more specifically in particular individual pipes are made to pass through the passage openings 15A of smaller diameter and bundles of pipes through the passage openings 15B of larger diameter.

By way of no limiting illustration, the equipment 25 comprises pipes, sensors, a cold finger, etc., and in particular all the conventional elements necessary to generate the low temperatures required for the storage of liquid hydrogen.

This mounting step E2 is carried out outside the tank 1, and this makes it possible to overcome the accessibility constraints that exist in the tank 1.

At the end of the mounting step E2, by virtue of said frames 14 and the equipment 25 that passes through the frames 14, a module 24 is obtained that has a structural stability allowing it to move.

Each of the frames 14 of the module 24 is also provided with as many connecting elements 16 as there are rails of the tank 1. These connecting elements 16 are fastened via their end 16A to the frame 14 and they are positioned at the periphery of the frame 14 so as to be able to be introduced into the slideways 8 of the rails 4 when the module 24 is mounted in the tank 1.

The insertion step E3 that follows consists in inserting the module 24 (as a unitary assembly) into the central portion 2 of the tank 1, from one of the ends 2A, 2B (FIG. 1) of the central portion 2. This insertion is performed via translation of the module 24 via sliding of the heads 18 of the connecting elements 16 in the slideways 8 of the rails 4.

Figure 10:
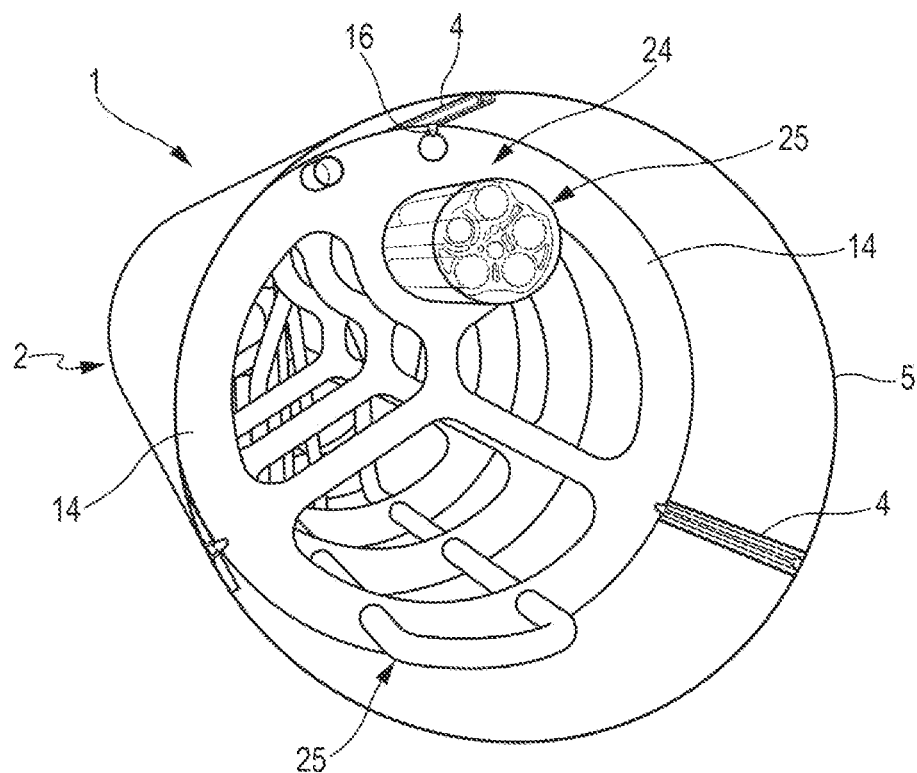
FIG. 10 is a view, in perspective, of a tank in which a module provided with frames and equipment is mounted.

The fastening step E4 is implemented, for its part, after the insertion step E3 when the module 24 is completely inserted (or installed) and is in its final position in the tank 1, as shown in FIG. 10. The fastening step E4 consists in holding the module 24 in position by any type of known means and for example by fastening the heads 18 of the connecting elements 16 to the rails 4.

To this end, in a first embodiment, the heads 18 of the connecting elements 16 are welded to the rails 4. Various conventional welding methods can be employed to carry out this welding, and in particular FSW (Friction Stir Welding) or LFW (Linear Friction Welding).

In a second embodiment, a blocking or locking system making it possible to block the heads 18 of the connecting elements 16 in the rails 4 is provided. By way of example, the blocking system can have, for each connecting element, a pin which is provided on the head of the connecting element, which is elastically loaded, and which is configured to enter an orifice made in the rail, when the frame (to which the connecting element is fastened) reaches its final position, during the insertion of the module into the central portion.

In the depiction in FIG. 3, one of the panels 5 of the tank 1 is removed, to make it possible to see the inside of the tank 1 and in particular the module 24, provided with the frames 14 and the equipment 25, which is installed therein.

The assembly method for obtaining a tank 1 for a liquid hydrogen reservoir 10, for example as shown in FIG. 3, involves other steps, for example a step of fastening domes to the central portion, which are not within the scope of the present invention and are not described further.

The present invention has numerous advantages, and in particular the following advantages:
  simplification of the manufacture and assembly of the tank 1, which preferably represents an internal tank of a liquid hydrogen reservoir 10, in particular for the following reasons:
    the assembly of the equipment in a single module 24 and the insertion into the tank of this single module 24;
    the use of a smaller number of pieces and the possibility of standardizing the main pieces used, namely mainly the panels 5, the rails 4, the frames 14 and the connecting elements 16;
    a smaller number of interface points and the omission of all the conventional fastening tabs;
    the omission of the anti-slosh walls; and
  the features of the invention can be adapted to tanks of various sizes and configurations.

The invention claimed is:
1. A tank for a liquid hydrogen reservoir, said tank comprising:
  a central portion having a wall, the wall comprising at least a first elongate panel and a second elongate panel, at least one rail integrated in the wall between the first elongate panel and the second elongate panel of the central portion of the tank so as to be accessible from inside the tank, said rail arranged on an internal face with a slideway configured to receive at least one connecting element, said slideway allowing a translational movement of the one or more connecting elements, wherein each of the first and second elongate panels comprise a curved shape in cross section, wherein the at least one rail comprises:
- an elongate base, the elongate base connected to and between the first elongate panel and the second elongate panel; and
- first and second brackets extending from the base, wherein each of the first and second brackets comprises a first branch extending from the base and a second branch perpendicular to the first branch, wherein the second branches delimit a recess between the first branches and the base, and define an opening to the recess, wherein the elongate base comprises a curved shape in cross-section, and wherein the first and second elongate panels and the elongate base have a same radius of curvature.

2. The tank as claimed in claim 1, wherein the rail is welded to the wall of the central portion of the tank.

3. The tank as claimed in claim 1, wherein the at least one rail comprises:
a plurality of longitudinal rails integrated in the wall of the central portion and oriented so as to have mutually parallel directions.

4. The tank as claimed in claim 1, further comprising:
at least one frame provided with passage openings, configured to be arranged transversely in the tank, by being mounted on the rails.

5. The tank as claimed in claim 4, further comprising:
a plurality of connecting elements, each of said connecting elements fastened to the frame via one of first and second ends thereof and having at other of the first and second ends a head configured to slide by cooperating with the rail and to be fastened to the rail.

6. The tank as claimed in claim 4, wherein at least one frame comprises a plurality of frames, the tank further comprising:
a module formed of the plurality of frames connected together via equipment, said module configured to be arranged in the tank, by being mounted on the rails.

7. A liquid hydrogen reservoir, comprising:
a tank as claimed in claim 1.

8. A method for manufacturing and assembling a tank as claimed in claim 6, comprising:
- a manufacturing step (E1) including manufacturing a tank provided with a central portion, said central portion having a wall in which a plurality of rails are integrated;
- a mounting step (E2) including mounting equipment in a plurality of frames disposed side by side and provided with connecting elements, so as to form a module;
- an insertion step (E3) including inserting the module into the tank by sliding heads of the connecting elements in the rails; and
- a fastening step (E4) including, in a position in which the module is mounted in the tank, holding the module in position.

9. The method as claimed in claim 8, wherein the fastening step (E4) includes, so as to hold the module in position, fastening the heads of the connecting elements to the rails.

* * * * *